US012520285B2

(12) United States Patent
Jiang et al.

(10) Patent No.: US 12,520,285 B2
(45) Date of Patent: Jan. 6, 2026

(54) LOW-LATENCY COMMUNICATION IN A WLAN

(71) Applicant: Apple Inc., Cupertino, CA (US)

(72) Inventors: Jinjing Jiang, San Jose, CA (US); Su Khiong Yong, Palo Alto, CA (US); Yong Liu, Campbell, CA (US); Jarkko L. Kneckt, Los Gatos, CA (US); Tianyu Wu, Fremont, CA (US); Lochan Verma, San Diego, CA (US); Qi Wang, Sunnyvale, CA (US); Guoqing Li, Campbell, CA (US)

(73) Assignee: Apple Inc., Cupertino, CA (US)

( * ) Notice: Subject to any disclaimer, the term of this patent is extended or adjusted under 35 U.S.C. 154(b) by 838 days.

(21) Appl. No.: 17/355,438

(22) Filed: Jun. 23, 2021

(65) Prior Publication Data

US 2021/0410137 A1   Dec. 30, 2021

Related U.S. Application Data

(60) Provisional application No. 63/044,068, filed on Jun. 25, 2020.

(51) Int. Cl.
*H04W 72/0446* (2023.01)
*H04W 72/21* (2023.01)
*H04W 72/543* (2023.01)

(52) U.S. Cl.
CPC ....... *H04W 72/0446* (2013.01); *H04W 72/21* (2023.01); *H04W 72/543* (2023.01)

(58) Field of Classification Search
CPC .................. H04W 72/0446; H04W 72/543; H04W 72/21

(Continued)

(56) References Cited

U.S. PATENT DOCUMENTS 7,339,892 B1 *  3/2008  Engwer ............ H04L 47/365
                                                370/235
9,198,194 B2 * 11/2015  Meylan ............ H04W 74/06
(Continued)

FOREIGN PATENT DOCUMENTS

CN       102740424       10/2012
CN       105703887        6/2016
(Continued)

OTHER PUBLICATIONS

Examination Report for IN Patent Application No. 202114028419; 5 pages; Jun. 13, 2022.
(Continued)

*Primary Examiner* — Chi Tang P Cheng
(74) *Attorney, Agent, or Firm* — Kowert, Hood, Munyon, Rankin & Goetzel, P.C.

(57) ABSTRACT

An electronic device may receive a frame associated with a second electronic device. This frame may include a MAC header with information specifying a request for a trigger or a trigger frame, and the information may include a suggested time interval during which the trigger or the trigger frame is to be provided and a requested resource allocation. For example, the MAC header may include an A-control field, and the A-control field may include the information or may include multiple A-MPDUs and one or more of the A-MPDUs (such as a last A-MPDU or all of the A-MPDUs) may include the information. Moreover, the time interval may begin at a previous transmission associated with the second electronic device, and the requested resource allocation may include a capacity. In response to the request, the electronic device may provide the trigger or the trigger frame addressed to the second electronic device.

20 Claims, 19 Drawing Sheets

(58) Field of Classification Search
USPC .......................................................... 370/336
See application file for complete search history.

(56) References Cited

U.S. PATENT DOCUMENTS

| | | | |
|---|---|---|---|
| 10,440,695 | B2 | 10/2019 | Lee et al. |
| 10,531,433 | B2* | 1/2020 | Frederiks .......... H04W 74/0891 |
| 10,624,072 | B2 | 4/2020 | Patel et al. |
| 2010/0008347 | A1* | 1/2010 | Qin ........................ H04W 74/04 |
| | | | 370/345 |
| 2014/0092816 | A1 | 4/2014 | Ito |
| 2017/0134138 | A1* | 5/2017 | Madhavan ............ H04L 1/1685 |
| 2018/0020428 | A1 | 1/2018 | Madhavan |
| 2018/0069678 | A1* | 3/2018 | Kim ........................ H04L 5/0053 |

FOREIGN PATENT DOCUMENTS

| | | |
|---|---|---|
| CN | 106559900 | 4/2017 |
| CN | 106656429 | 5/2017 |
| CN | 107211447 | 9/2017 |
| CN | 107852745 | 3/2018 |
| CN | 109314689 | 2/2019 |
| CN | 109417817 | 3/2019 |
| CN | 109429319 | 3/2019 |
| CN | 109792776 | 5/2019 |
| CN | 109951892 | 6/2019 |
| CN | 110226353 | 9/2019 |
| CN | 110233651 | 9/2019 |
| CN | 110521250 | 11/2019 |
| CN | 110662201 | 1/2020 |
| CN | 110912668 | 3/2020 |
| EP | 3313012 | 4/2018 |
| WO | 2016126055 | 8/2016 |

OTHER PUBLICATIONS

Search Report for CN Application No. 202110705797.5; Jul. 1, 2023.
Ericsson "Coexistence evaluation results for NR-U and WiFi": 3GPP TSG RAN WG1 Meeting #94bis R1-1811297; Oct. 8, 2018.
Yang "802.11ax: The Coming New WLAN System with More than 4x MAC Throughput Enhancement"; IEEE, 2017.
Notice of Grant for CN Patent Application No. 202110705797.5; Nov. 23, 2023.

* cited by examiner

LOW-LATENCY COMMUNICATION IN A WLAN

CROSS-REFERENCE TO RELATED APPLICATION

This application claims the benefit of U.S. Provisional Application No. 63/044,068, entitled "Low-Latency Communication in a WLAN," by Jinjing Jiang, et al., filed Jun. 25, 2020, the contents of which are hereby incorporated by reference.

FIELD

The described embodiments relate, generally, to wireless communications among electronic devices, including techniques for low-latency communication in a wireless local area network (WLAN).

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi').

In order to meet ever-challenging quality-of-service (QoS) requirements, wireless communication performance may be improved. This may involve: multi-link transmission, a higher modulation coding scheme (MCS), a larger number of spatial streams (NSS), by using spatial reuse, and/or increasing the bandwidth (e.g., to 320 MHz). However, these types of changes may require modifications to an existing IEEE 802.11 standard or a new IEEE 802.11 standard, which can be expensive and may not be available until compatible integrated circuits are available.

SUMMARY

In a first group of embodiments, an electronic device that receives a trigger or a trigger frame is described. This electronic device includes: an antenna node that can communicatively couple to an antenna; and an interface circuit that communicates with a second electronic device. During operation, the interface circuit receives, at the antenna node, a frame associated with the second electronic device, where the frame includes information specifying a request for the trigger, and the information includes a suggested time interval during which the trigger is to be provided and a requested resource allocation.

Moreover, the interface circuit may provide, from the antenna node, the trigger addressed to the second electronic device based at least in part on the request for the trigger.

Furthermore, the interface circuit may receive, at the antenna node, a second frame associated with the second electronic device. Additionally, the interface circuit may cancel the request for the trigger at a subsequent transmit opportunity when a second request for a trigger, a trigger frame or a trigger update associated with the second electronic device is not received.

Note that the frame may include a media access control (MAC) header that includes an A-control field, and the A-control field may include the information. Alternatively or additionally, the frame may include multiple aggregated-MAC-level protocol data units (A-MPDUs) and each of the A-MPDUs may include the information. In some embodiments, the frame may include multiple A-MPDUs and a last A-MPDU in the multiple A-MPDUs comprises the information.

Moreover, the frame may include: a data frame with an A-Control subfield in a MAC header specifying the information of the request for the trigger, or a control frame alone specifying the information of the request for the trigger.

Furthermore, the requested resource allocation may include a capacity.

Additionally, the time interval may begin at a previous transmission associated with the second electronic device.

In some embodiments, the request for the trigger may be associated with a subset of types of access categories. Moreover, the request for the trigger may be based at least in part on latency requirements that were previously negotiated with the second electronic device. Note that the latency requirements may specify a subset of types of access categories. Alternatively or additionally, the latency requirements may specify a frequency of requests for triggers or trigger frames associated with the second electronic device.

Furthermore, the interface circuit may receive, at the antenna node, a scheduling session request frame associated with the second electronic device, where the scheduling session request frame may include a request for periodic triggers.

Other embodiments provide a second electronic device that provides a trigger or a trigger frame. This second electronic device includes: an antenna node that can communicatively couple to an antenna; and an interface circuit that communicates with an electronic device. During operation, the interface circuit provides, from the antenna node, a frame addressed to the electronic device, where the frame includes information specifying a request for the trigger or the trigger frame, and the information includes a suggested time interval during which the trigger or the trigger frame is to be provided and a requested resource allocation.

Other embodiments provide an integrated circuit (which is sometimes referred to as a 'communication circuit') for use with the electronic device or the second electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

In a second group of embodiments, an electronic device that receives a scheduling session request frame is described. This electronic device includes: an antenna node that can communicatively couple to an antenna; and an interface circuit that communicates with a second electronic device. During operation, the interface circuit receives, at the antenna node, the scheduling session request frame associated with the second electronic device, where the scheduling session request frame includes a request for periodic triggers.

Other embodiments provide a second electronic device that provides a scheduling session request frame. This second electronic device includes: an antenna node that can communicatively couple to an antenna; and an interface circuit that communicates with an electronic device. During operation, the interface circuit provides, from the antenna node, the scheduling session request frame addressed to the electronic device, where the scheduling session request frame includes a request for periodic triggers.

Note that the request for periodic triggers may correspond to a queue condition in the second electronic device.

Other embodiments provide an integrated circuit (which is sometimes referred to as a 'communication circuit') for use with the electronic device or the second electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

In a third group of embodiments, an electronic device that negotiates feedback is described. This electronic device includes: an antenna node that can communicatively couple to an antenna; and an interface circuit that communicates with a second electronic device. During operation, the interface circuit negotiates, via the interface circuit, the feedback associated with the second electronic device, where the feedback is associated with communication between the electronic device and the second electronic device, and the interface circuit adapts a link between the electronic device and the second electronic device based at least in part on the feedback.

Note that the negotiation may specify a type of feedback. Moreover, the type of feedback may include: selective feedback based at least in part on a communication condition associated with the link; one or more physical layer measurements; or feedback computed in a MAC layer. Furthermore, the negotiation may specify an accuracy of the measurements.

Other embodiments provide a second electronic device that negotiates feedback. This second electronic device includes: an antenna node that can communicatively couple to an antenna; and an interface circuit that communicates with an electronic device. During operation, the interface circuit negotiates, via the interface circuit, the feedback with the electronic device, where the feedback is from the second electronic device and is associated with communication between the electronic device and the second electronic device.

Other embodiments provide an integrated circuit (which is sometimes referred to as a 'communication circuit') for use with the electronic device or the second electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

In a fourth group of embodiments, an electronic device that receives a multi-station block acknowledgment (M-BA) frame is described. This electronic device includes: an antenna node that can communicatively couple to an antenna; and an interface circuit that communicates with a second electronic device. During operation, the interface circuit provides, from the antenna node, a frame addressed to the second electronic device. Then, the interface circuit receives, at the antenna node, the M-BA frame associated with the second electronic device, where the M-BA frame includes feedback about communication between the electronic device and the second electronic device.

Note that the M-BA frame may include an association identifier (AID) field value exceeding 2007.

Moreover, the M-BA frame may include a predefined AID field value that specifies the second electronic device.

Furthermore, the feedback may be provided in a type-length-value format, and the M-BA frame may include an AID field value that specifies the type.

Additionally, the M-BA frame may include an acknowledgment type plus a traffic identifier that specifies a type of the feedback.

In some embodiments, the M-BA frame may include non-block-acknowledgment information.

Moreover, the M-BA frame may include feedback information about communication between the electronic device and the second electronic device.

Other embodiments provide a second electronic device that provides a M-BA frame. This second electronic device includes: an antenna node that can communicatively couple to an antenna; and an interface circuit that communicates with an electronic device. During operation, the interface circuit receives, at the antenna node, a frame associated with the electronic device. Then, the interface circuit provides, from the antenna node, the M-BA frame addressed to the electronic device, where the M-BA frame includes feedback about communication between the electronic device and the second electronic device.

Other embodiments provide an integrated circuit (which is sometimes referred to as a 'communication circuit') for use with the electronic device or the second electronic device. The integrated circuit may perform at least some of the aforementioned operations.

Other embodiments provide a computer-readable storage medium for use with the electronic device or the second electronic device. When program instructions stored in the computer-readable storage medium are executed by the electronic device or the second electronic device, the program instructions may cause the electronic device or the second electronic device to perform at least some of the aforementioned operations of the electronic device or the second electronic device.

Other embodiments provide a method. The method includes at least some of the aforementioned operations performed by the electronic device or the second electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
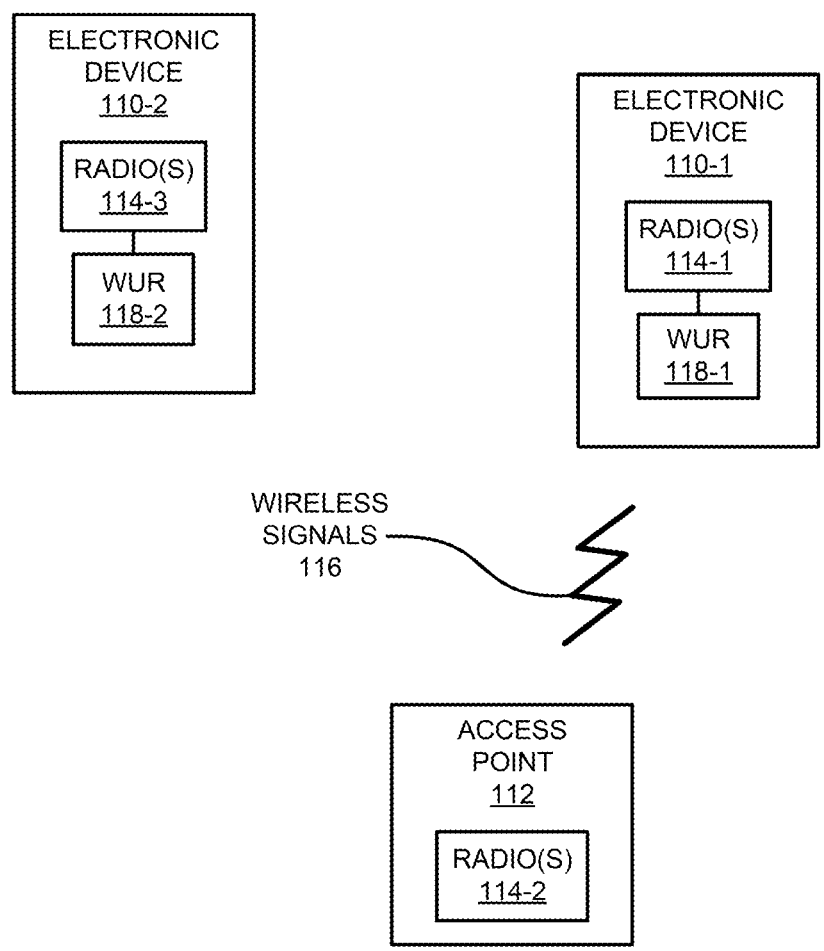
FIG. 1 illustrates an example network environment for communication between electronic devices according to some embodiments of the disclosure.

Some embodiments include an electronic device (e.g., an access point) that receives a request for a trigger or a trigger frame. During operation, the electronic device may receive a frame associated with a second electronic device (e.g., a station). This frame may include a MAC header with information specifying the request for the trigger or the trigger frame, and the information may include a suggested time interval during which the trigger or the trigger frame is to be provided and a requested resource allocation. For example, the MAC header may include an A-control field, and the A-control field may include the information. In some embodiments, the frame may include multiple A-MPDUs and one or more of the A-MPDUs (such as a last A-MPDU or all of the A-MPDUs) may include the information. Moreover, the time interval may begin at a previous transmission associated with the second electronic device, and the requested resource allocation may include a capacity. In response to the request for the trigger or the trigger frame, the electronic device may provide the trigger or the trigger frame addressed to the second electronic device.

In some embodiments, the second electronic device may provide a scheduling session request frame to the electronic device requesting periodic triggers based at least in part on a queue condition in the second electronic device. Moreover, in some embodiments the electronic device and the second electronic device may negotiate feedback about communication between the electronic device and the second electronic device, and the feedback may be used by the electronic device to adapt a link between the electronic device and the second electronic device. Furthermore, in some embodiments, the second electronic device may provide a multi-station block acknowledgment (M-BA) frame includes feedback about communication between the electronic device and the second electronic device, and the feedback may be used by the electronic device to adapt a link between the electronic device and the second electronic device.

By requesting the trigger, the trigger frame or the periodic triggers or trigger frames, or providing the feedback to enable link adaptation, these communication techniques may improve communication performance during communication between the electronic device and the second electronic device using traffic engineering. For example, the communication techniques may provide low latency flows. Alternatively or additionally, the communication techniques may improve traffic engineering by applying various types of policies or techniques with existing communication infrastructure, such as: with admission control, prioritized channel access and/or flow control. However, these improvements may not require modifications to an existing IEEE 802.11 standard or a new IEEE 802.11 standard. Consequently, the communication techniques may improve the user experience and customer satisfaction when using the electronic device and/or the second electronic device without the time delays and expense associated with the development of new integrated circuits.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have one or more connections with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 23:
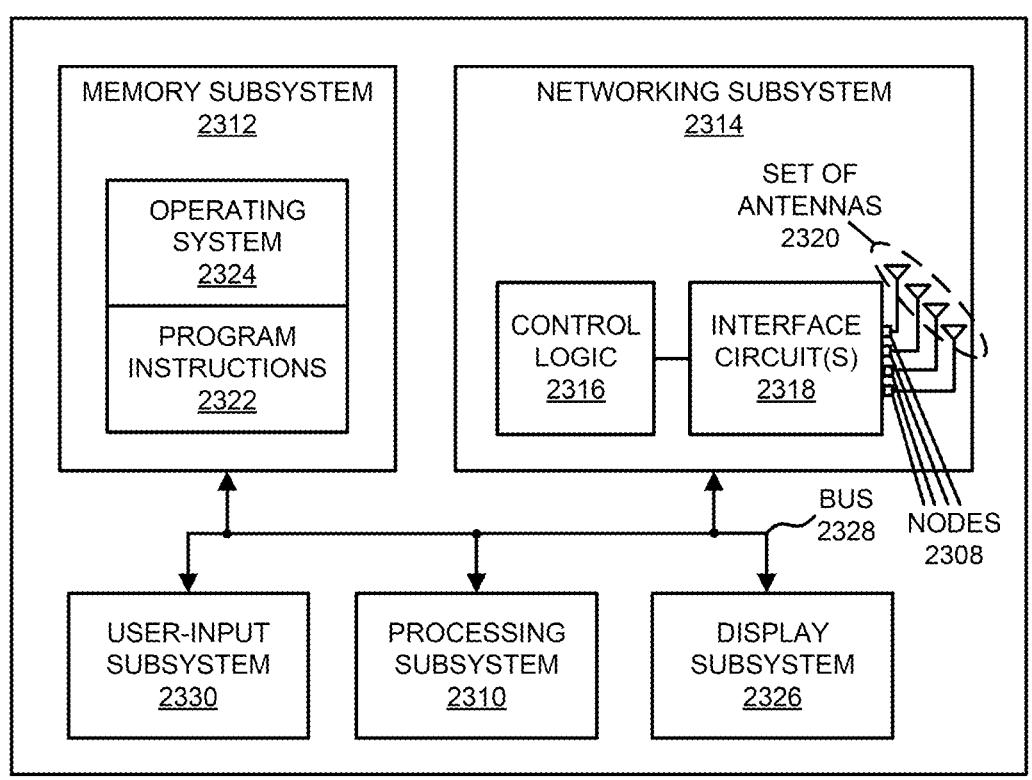
FIG. 23 illustrates an example of an electronic device of FIG. 1 according to some embodiments of the disclosure.

As described further below with reference to FIG. 23, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-22, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

As discussed previously, communication performance may be improved by modifying an IEEE 802.11 standard or by defining new IEEE 802.11 standards. However, these approaches may have extensive time delays and expense associated with the development of new integrated circuits.

In order to address these challenges, as described below with reference to FIGS. 2-22, in some embodiments of the disclosed communication techniques electronic device 110-1 may provide a frame to access point 112, where the frame includes information specifying a request for a trigger or a trigger frame, and the information may include a suggested time interval during which the trigger or the trigger frame is to be provided and a requested resource allocation (such as a capacity). For example, the time interval may begin at a previous transmission associated with electronic device 110-1.

After receiving the frame, access point 112 may provide the trigger or the trigger frame to electronic device 110-1, where the trigger or the trigger frame is based at least in part on the request for the trigger or the trigger frame. This trigger may be received by electronic device 110-1. In response, electronic device 110-1 may provide a second frame to access point 112, which may be received by access point 112. Alternatively or additionally, access point 112 may cancel the request for the trigger or the trigger frame at a subsequent transmit opportunity (TXOP) when a second request for a trigger, a trigger frame or a trigger update associated with electronic device 110-1 is not received.

In some embodiments, electronic device 110-1 may provide a scheduling session request frame to access point 112, where the scheduling session request frame includes a request for periodic triggers. Note that the request for the periodic triggers may correspond to a queue condition in electronic device 110-1. After receiving the scheduling session request frame, access point 112 may determine whether to confirm the scheduling request from electronic device 110-1. Based at least in part on the determination, access point 112 may confirm the scheduling request by transmitting a scheduling response frame to electronic device 110-1. Moreover, after receiving the scheduling response frame, electronic device 110-1 may transmit a response to access point 112, where the response confirms the scheduling request.

Moreover, after receiving the response (i.e., when the scheduling request is confirmed), access point 112 may determine a communication schedule for a session associated with electronic device 110-1 based at least in part on the request for periodic triggers. Then, access point 112 may provide the periodic triggers to electronic device 110-1 based at least in part on the communication schedule. These periodic triggers may be received by electronic device 110-1.

Furthermore, in some embodiments, access point 112 may negotiate (e.g., by exchanging packets or frames) feedback with electronic device 110-1, where the feedback is associated with communication between access point 112 and electronic device 110-1. For example, the negotiation may specify a type of feedback, such as: selective feedback based at least in part on a communication condition associated with a link between access point 112 and electronic device 110-1; one or more physical layer measurements; or feedback computed in a MAC layer. Furthermore, the negotiation may specify an accuracy of the measurements.

Then, access point 112 may communicate packets or frames electronic device 110-1. Moreover, electronic device 110-1 may provide the feedback to access point 112 about or associated with the communication of the frames based at least in part on the negotiation. After receiving the feedback, access point 112 may adapt the link between access point 112 and electronic device 110-1 based at least in part on the feedback.

Additionally, in some embodiments access point 112 may provide a frame to electronic device 110-1. After receiving the frame, electronic device 110-1 may provide a M-BA frame to access point 112, where the M-BA frame includes feedback about communication between access point 112 and electronic device 110-1. Then, access point 112 may receive the M-BA frame, and may adapt a link between access point 112 and electronic device 110-1 based at least in part on the feedback.

In summary, the communication techniques may improve communication performance during communication between the electronic device and the second electronic device using traffic engineering. For example, the communication techniques may improve traffic engineering by applying various types of policies or techniques with existing communication infrastructure, such as: with admission control, prioritized channel access and/or flow control (such as low latency flows). Moreover, these improvements may not have the time delays and expense associated with the development of new integrated circuits.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments (BAs) to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110 and/or 112. Consequently, one of electronic devices 110 and/or 112 may perform operations in the communication techniques.

Figure 2:
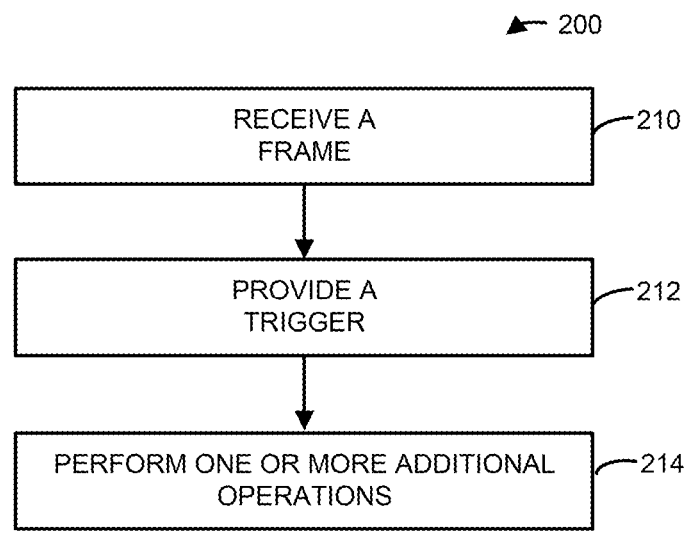
FIG. 2 illustrates an example method for providing a trigger or a trigger frame for low-latency communication according to some embodiments of the disclosure.

FIG. 2 presents a flow diagram illustrating an example method 200 for providing a trigger or a trigger frame. This method may be performed by an electronic device, such as access point 112 in FIG. 1. Note that the communication with a second electronic device may be compatible with an IEEE 802.11 communication protocol.

During operation, the electronic device may receive a frame (operation 210) associated with the second electronic device, where the frame includes information specifying a request for the trigger or the trigger frame, and the information includes a suggested time interval during which the trigger or the trigger frame is to be provided and a requested resource allocation.

Note that the frame may include a MAC header that includes an A-control field, and the A-control field may include the information. Alternatively or additionally, the frame may include multiple A-MPDUs and each of the A-MPDUs may include the information. In some embodiments, the frame may include multiple A-MPDUs and a last A-MPDU in the multiple A-MPDUs comprises the information. Moreover, the frame may include: a data frame with an A-Control subfield in a MAC header specifying the information of the request for the trigger or the trigger frame, or a control frame alone specifying the information of the request for the trigger or the trigger frame. Furthermore, the requested resource allocation may include a capacity. Additionally, the time interval may begin at a previous transmission associated with the second electronic device.

Then, the electronic device may provide the trigger (operation 212) or the trigger frame addressed to the second electronic device based at least in part on the request for the trigger or the trigger frame.

In some embodiments, the electronic device optionally performs one or more additional operations (operation 214). For example, the electronic device may receive a second frame associated with the second electronic device. Additionally, the electronic device may cancel the request for the trigger or the trigger frame at a subsequent transmit opportunity when a second request for a trigger, a trigger frame or a trigger update associated with the second electronic device is not received.

In some embodiments, the request for the trigger or the trigger frame may be associated with a subset of types of access categories. Moreover, the request for the trigger or the trigger frame may be based at least in part on latency requirements that were previously negotiated with the second electronic device. Note that the latency requirements may specify a subset of types of access categories. Alternatively or additionally, the latency requirements may specify a frequency of requests for triggers or trigger frames associated with the second electronic device.

Furthermore, the electronic device may receive a scheduling session request frame associated with the second electronic device, where the scheduling session request frame may include a request for periodic triggers.

Figure 3:
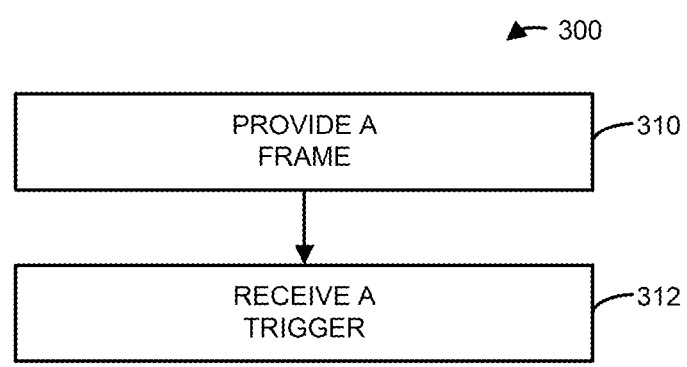
FIG. 3 illustrates an example method for receiving a trigger or a trigger frame for low-latency communication according to some embodiments of the disclosure.

FIG. 3 presents a flow diagram illustrating an example method 300 for receiving a trigger or a trigger frame. This method may be performed by a second electronic device, such as electronic device 110-1 in FIG. 1. Note that the communication with an electronic device may be compatible with an IEEE 802.11 communication protocol.

During operation, the second electronic device may provide a frame (operation 310) addressed to the electronic device, where the frame includes information specifying a request for the trigger or the trigger frame, and the information includes a suggested time interval during which the trigger or the trigger frame is to be provided and a requested resource allocation. Then, the second electronic device may receive the trigger (operation 312) or the trigger frame associated with the electronic device based at least in part on the request for the trigger or the trigger frame.

Figure 4:
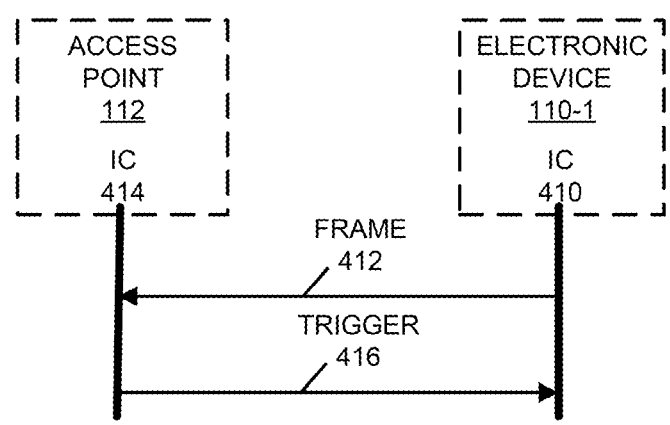
FIG. 4 illustrates an example of communication among components, e.g., in the electronic devices of FIG. 1 according to some embodiments of the disclosure.

The communication techniques are further illustrated in FIG. 4, which presents a flow diagram illustrating an example of communication among components in electronic device 110-1 and access point 112. During operation, an interface circuit (IC) 410 in electronic device 110-1 provides a frame 412 to access point 112. This frame may include information specifying a request for a trigger or a trigger frame, and the information may include a suggested time interval during which trigger 416 is to be provided and a requested resource allocation.

After receiving frame 412, an interface circuit 414 in access point 112 may provide trigger 416 to electronic device 110-1, where trigger 416 is based at least in part on the request for trigger in frame 412. Trigger 416 may be received by interface circuit 410.

Figure 5:
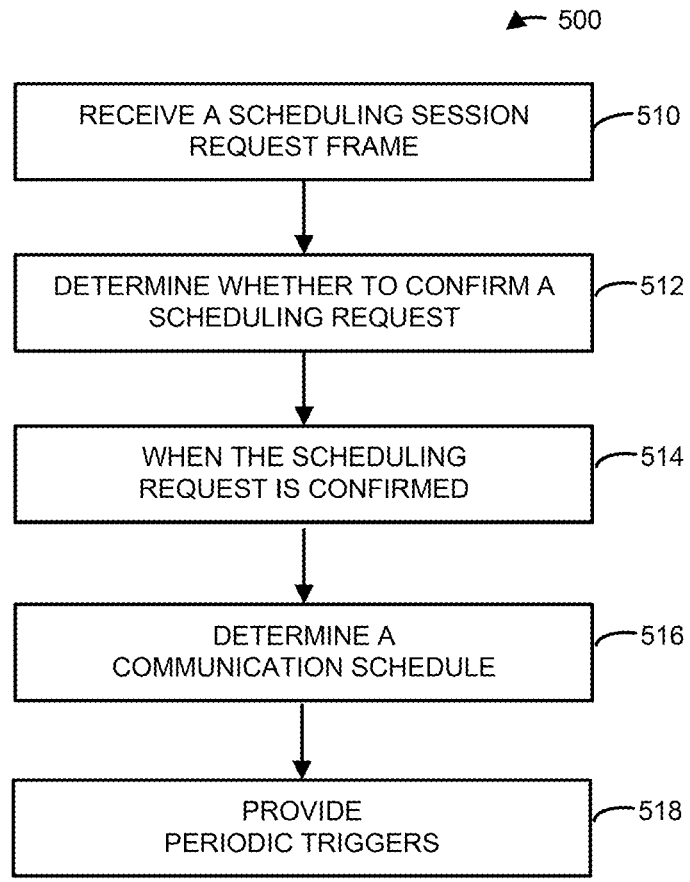
FIG. 5 illustrates an example method for determining a communication schedule according to some embodiments of the disclosure.

FIG. 5 presents a flow diagram illustrating an example method 500 for determining a communication schedule. This method may be performed by an electronic device, such as access point 112 in FIG. 1. Note that the communication with a second electronic device may be compatible with an IEEE 802.11 communication protocol.

During operation, the electronic device may receive a scheduling session request frame (operation 510) associated with the second electronic device, where the scheduling session request frame includes a request for periodic triggers. Note that the request for periodic triggers may correspond to a queue condition in the second electronic device.

Then, the electronic device may determine whether to confirm the scheduling request (operation 512). Based on the determination to confirm the scheduling request, the electronic device may transmit a scheduling response frame (operation 514). The electronic device may determine the communication schedule (operation 516) for a session associated with the second electronic device based at least in part on the request for periodic triggers.

In some embodiments, the electronic device may optionally provide the periodic triggers (operation 518) based at least in part on the determined communication schedule.

Figure 6:
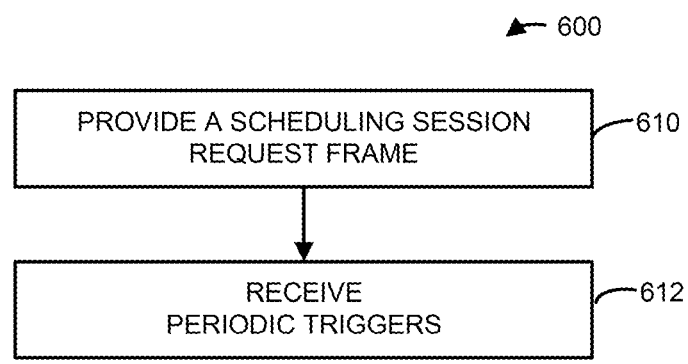
FIG. 6 illustrates an example method for receiving periodic triggers according to some embodiments of the disclosure.

FIG. 6 presents a flow diagram illustrating an example method 600 for receiving periodic triggers. This method may be performed by a second electronic device, such as electronic device 110-1 in FIG. 1. Note that the communication with an electronic device may be compatible with an IEEE 802.11 communication protocol.

During operation, the second electronic device may provide a scheduling session request frame (operation 610) addressed to the electronic device, where the scheduling session request frame includes a request for the periodic triggers. Then, the second electronic device may receive the periodic triggers (operation 612) associated with the electronic device.

Figure 7:
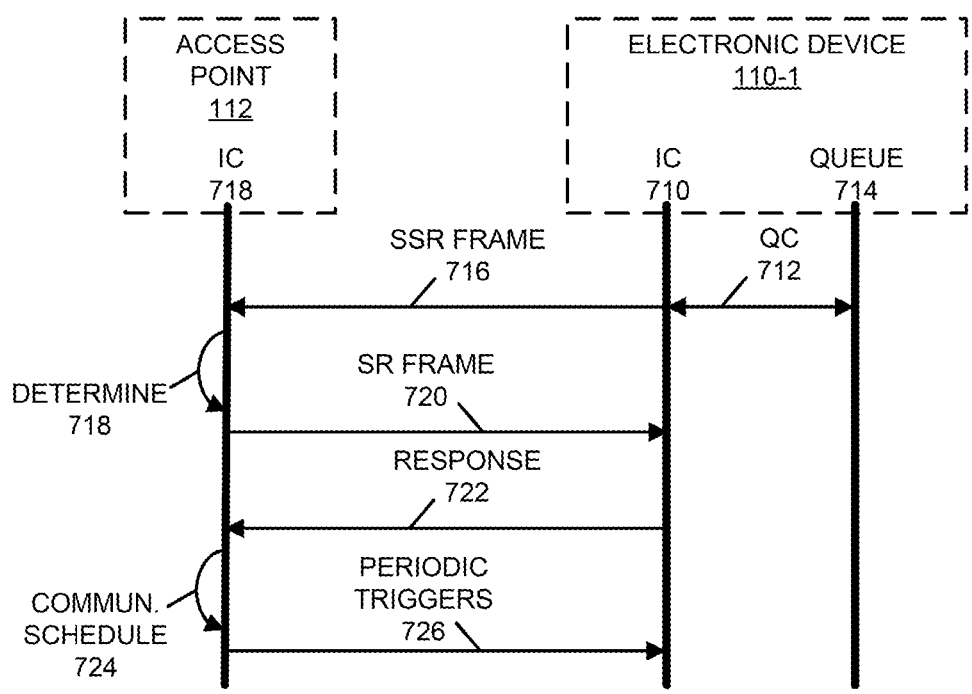
FIG. 7 illustrates an example of communication among components, e.g., in the electronic devices of FIG. 1 according to some embodiments of the disclosure.

The communication techniques are further illustrated in FIG. 7, which presents a flow diagram illustrating an example of communication among components in electronic device 110-1 and access point 112. During operation, an interface circuit (IC) 710 in electronic device 110-1 may assess a queue condition (QC) 712 of a queue 714 in electronic device 110-1. Then, interface circuit 710 may provide a scheduling session request (SSR) frame 716 to access point 112, where scheduling session request frame 716 includes a request for periodic triggers. Note that the request for periodic triggers 726 may correspond to queue condition 712.

After receiving scheduling session request frame 716, an interface circuit 718 in access point 112 may determine 718 whether to confirm the scheduling request by transmitting a scheduling response (SR) frame 720. Based at least in part on determination 718, interface circuit 718 may transmit scheduling response frame 720 to electronic device 110-1. Moreover, after receiving scheduling response frame 720, interface circuit 710 may transmit a response 722 to access point 112, where response 722 confirms the scheduling request.

Moreover, after receiving response 722 (e.g., when the scheduling request is confirmed), interface circuit 718 may determine a communication schedule 724 for a session associated with electronic device 110-1 based at least in part on the request for periodic triggers. Then, interface circuit 718 may provide periodic triggers 726 to electronic device 110-1 based at least in part on communication schedule 724. These periodic triggers may be received by interface circuit 710.

Figure 8:
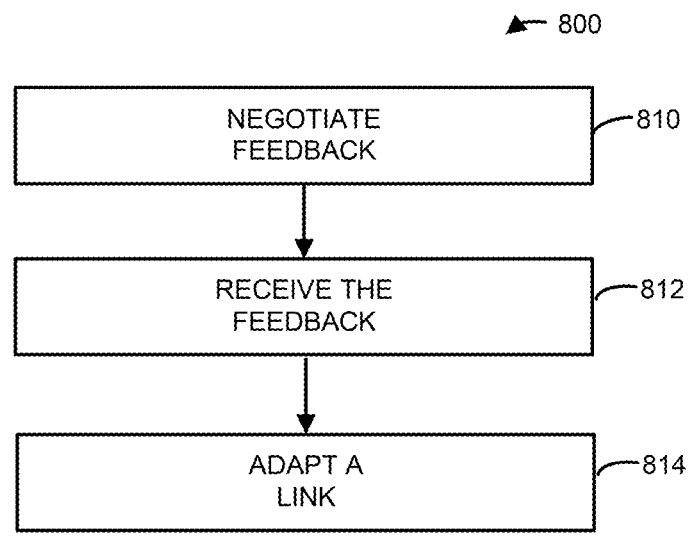
FIG. 8 illustrates an example method for adapting a link, e.g., using an electronic device of FIG. 1 according to some embodiments of the disclosure.

FIG. 8 presents a flow diagram illustrating an example method 800 for adapting a link. This method may be performed by an electronic device, such as access point 112 in FIG. 1. Note that the communication with a second electronic device may be compatible with an IEEE 802.11 communication protocol.

During operation, the electronic device may negotiate feedback (operation 810) associated with the second electronic device, where the feedback is associated with communication between the electronic device and the second electronic device. Note that the negotiation may specify a type of feedback. Moreover, the type of feedback may include: selective feedback based at least in part on a communication condition associated with the link; one or more physical layer measurements; and/or feedback computed in a MAC layer. Furthermore, the negotiation may specify an accuracy of the measurements.

Then, the electronic device may receive the feedback (operation 812) associated with the second electronic device. Next, the electronic device may adapt the link (operation 814) between the electronic device and the second electronic device based at least in part on the feedback.

Figure 9:
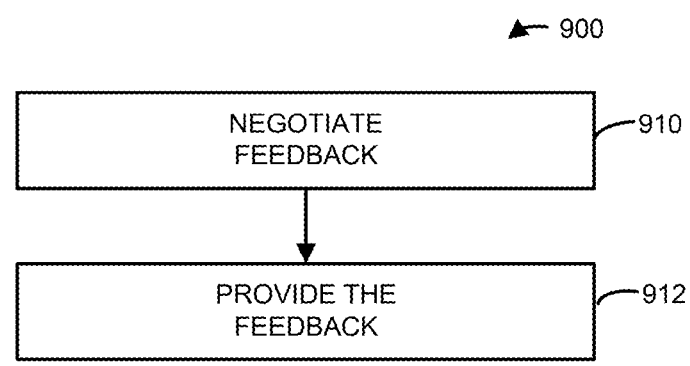
FIG. 9 illustrates an example method for providing feedback according to some embodiments of the disclosure.

FIG. 9 presents a flow diagram illustrating an example method 900 for negotiating feedback. This method may be performed by a second electronic device, such as electronic device 110-1 in FIG. 1. Note that the communication with an electronic device may be compatible with an IEEE 802.11 communication protocol.

During operation, the second electronic device may negotiate the feedback (operation 910) with the electronic device. Then, the second electronic device may provide the feedback (operation 912) addressed to the electronic device, wherein the feedback is based at least in part on the negotiation and is associated with communication between the electronic device and the second electronic device.

Figure 10:
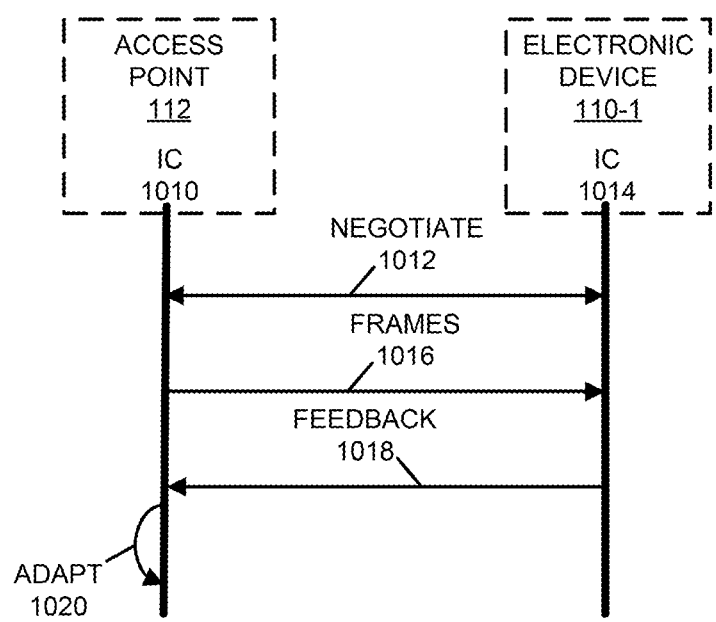
FIG. 10 illustrates an example of communication among components, e.g., in the electronic devices of FIG. 1 according to some embodiments of the disclosure.

The communication techniques are further illustrated in FIG. 10, which presents a flow diagram illustrating an example of communication among components in electronic device 110-1 and access point 112. During operation, an interface circuit (IC) 1010 in access point 112 may negotiate 1012 feedback 1016 with an interface circuit 1014 in electronic device 110-1, where feedback 1018 is associated with communication between access point 112 and electronic device 110-1.

Then, interface circuit 1010 may communicate packets or frames 1016 with interface circuit 1014. For example, at least access point 112 may transmit frames 1016. Moreover, interface circuit 1014 may provide feedback 1018 to access point 112 about or associated with the received communication of frames 1016 based at least in part on negotiation 1012. After receiving feedback 1018, interface circuit 1010 may adapt 1020 a link between access point 112 and electronic device 110-1 based at least in part on feedback 1018.

Figure 11:
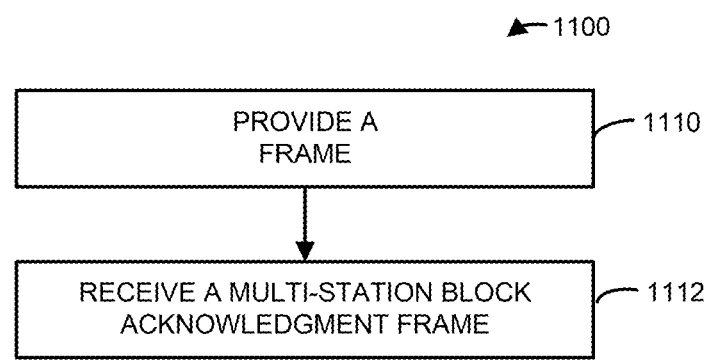
FIG. 11 illustrates an example method for receiving feedback according to some embodiments of the disclosure.

FIG. 11 presents a flow diagram illustrating an example method 1100 for receiving feedback. This method may be performed by an electronic device, such as access point 112 in FIG. 1. Note that the communication with a second electronic device may be compatible with an IEEE 802.11 communication protocol.

During operation, the electronic device may provide a frame (operation 1110) addressed to the second electronic device. Then, the electronic device may receive a M-BA frame (operation 1112) associated with the second electronic device, where the M-BA frame includes the feedback about communication between the electronic device and the second electronic device.

Note that the M-BA frame may include an association identifier (AID) field value exceeding 2007. Moreover, the M-BA frame may include a predefined AID field value that specifies the second electronic device. Furthermore, the feedback may be provided in a type-length-value format, and the M-BA frame may include an AID field value that specifies the type. Additionally, the M-BA frame may include an acknowledgment type plus a traffic identifier that specifies a type of the feedback. In some embodiments, the M-BA frame may include non-block-acknowledgment information.

Figure 12:
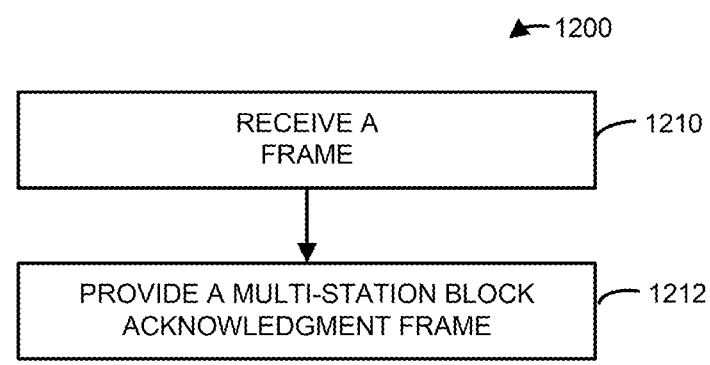
FIG. 12 illustrates an example method for providing feedback according to some embodiments of the disclosure.

FIG. 12 presents a flow diagram illustrating an example method 1200 for providing feedback. This method may be performed by a second electronic device, such as electronic device 110-1 in FIG. 1. Note that the communication with an electronic device may be compatible with an IEEE 802.11 communication protocol.

During operation, the second electronic device may receive a frame (operation 1210) associated with the electronic device. Then, the second electronic device may provide a M-BA frame (operation 1212) addressed to the electronic device, where the M-BA frame includes the feedback about communication between the electronic device and the second electronic device.

In some embodiments of method 200 (FIG. 2), 300 (FIG. 3), 500 (FIG. 5), 600 (FIG. 6), 800 (FIG. 8), 900 (FIG. 9), 1100 (FIG. 11) and/or 1200, as well as in some or all of the figures below, there may be additional or fewer operations. Further, one or more different operations may be included. Moreover, the order of the operations may be changed, and/or two or more operations may be combined into a single operation or performed at least partially in parallel.

Figure 13:
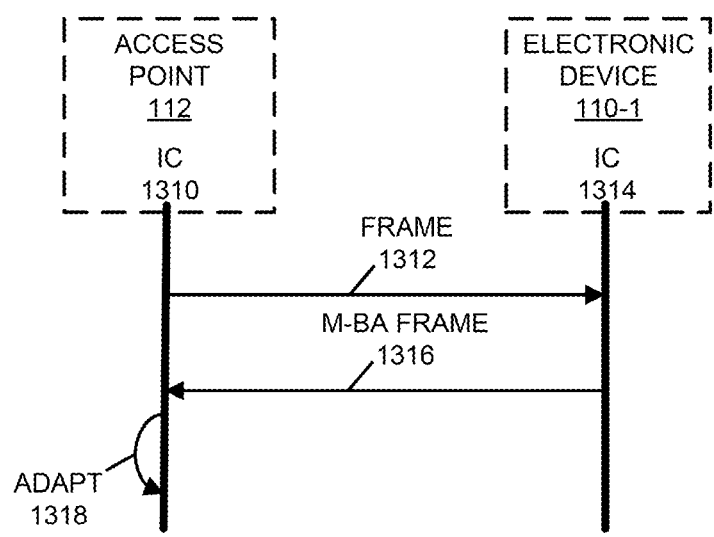
FIG. 13 illustrates an example of communication among components, e.g., in the electronic devices of FIG. 1 according to some embodiments of the disclosure.

The communication techniques are further illustrated in FIG. 13, which presents a flow diagram illustrating an example of communication among components in electronic device 110-1 and access point 112. During operation, an interface circuit (IC) 1310 in access point 112 may provide a frame 1312 to electronic device 110-1. After receiving frame 1312, an interface circuit 1314 in electronic device 110-1 may provide a M-BA frame 1316 to access point 112, where M-BA frame 1316 includes feedback about communication between access point 112 and electronic device 110-1. Then, interface circuit 1310 may receive M-BA 1316, and may optionally adapt 1318 a link between access point 112 and electronic device 110-1 based at least in part on the feedback.

While communication between the components in FIGS. 4, 7, 10, and 13 are illustrated with unilateral or bilateral communication (e.g., lines having a single arrow or dual arrows), in general a given communication operation may be unilateral or bilateral.

In some embodiments or the communication techniques in order to achieve or meet a low latency requirement for flows, a constant and bounded queue size or improved bounding of the queue size may be needed. As discussed further below, this may be achieved using delay or queue-based flow control. For example, more transmission opportunities may be used to manage a surge in the queue size and/or transmit opportunities may be improved or optimized by considering the delay or queue size in an electronic device. Alternatively or additionally, in order to achieve or meet a low latency requirement for flows, zero or very low retransmissions may be needed. Notably, as discussed further below, this may be achieved using robust rate adaptation and transmission protection. For example, a fast link adaptation may be used.

Figure 14:
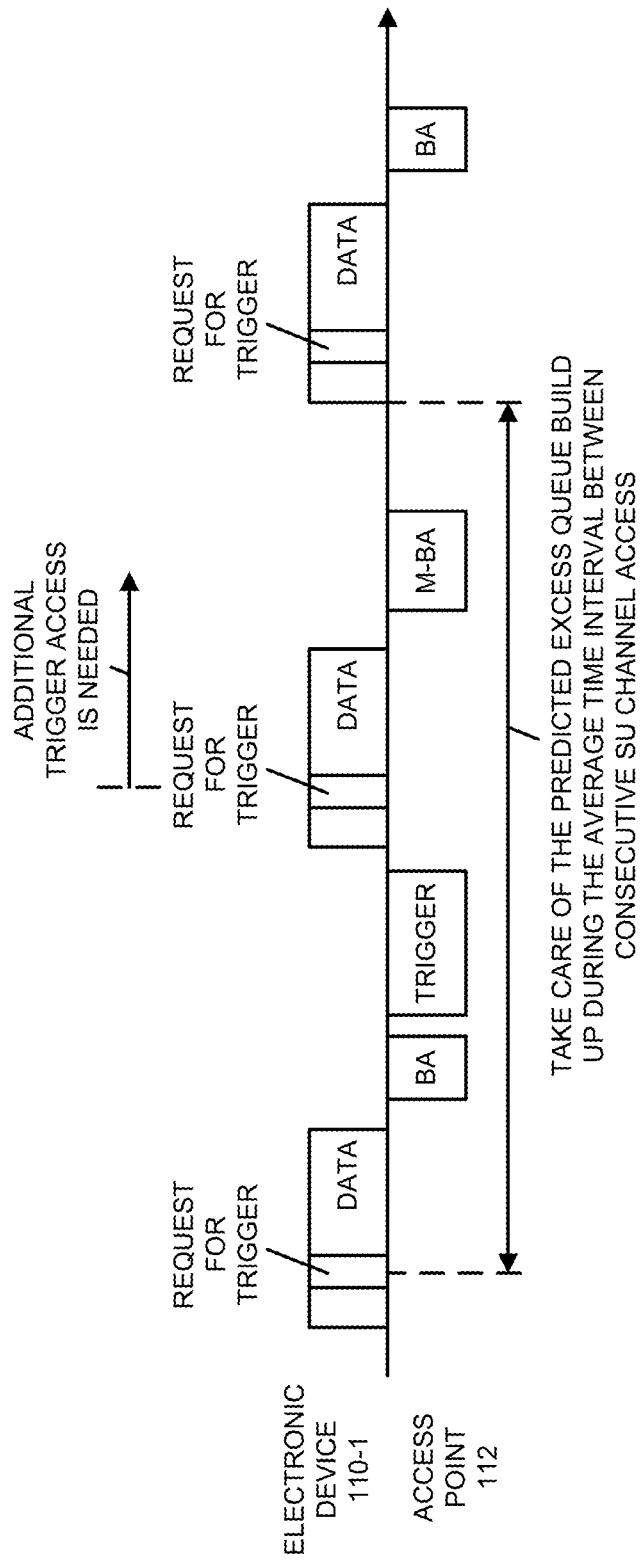
FIGS. 14-17 illustrate examples of communication, e.g., between the electronic devices of FIG. 1 according to some embodiments of the disclosure.

We now discuss more transmit opportunities and transmit optimization. As shown in FIG. 14, which presents a drawing illustrating an example of communication between access point 112 and electronic device 110-1, the number of transmit opportunities may be increased by having a client or a station (such as electronic device 110-1) provide to access point 112 a request for a trigger (e.g., that access point 112 may provide a trigger frame). For example, this request for a trigger or a trigger frame may be provided in a MAC header (such as in an A-control field) in an arbitrary frame (such as a data frame). Alternatively, the request for a trigger or a trigger frame may be provided in a control frame, which may be aggregated with a data frame.

In some embodiments, the request for a trigger or a trigger frame may include a suggestion for a time deadline for the trigger or the trigger frame (e.g., that the trigger or the trigger frame may be provided within a time interval or by a timestamp, which is sometimes referred to as a 'trigger deadline'). This time deadline may be determined by a tolerable or acceptable queuing delay. Moreover, the request for a trigger or a trigger frame may include a resource allocation, such as in the time and/or frequency domain (such as a desired capacity, resource units, etc.). The resource allocation may correspond to a desired queue reduction (such as a minimum queue reduction) to maintain a bounded queue size in response to the trigger or the trigger frame.

Note that this capability may address the predicted excess queue in electronic device 110-1 that is built-up during the average time interval between consecutive single-user channel access. In addition, in the triggered uplink (UL) physical layer convergence procedure (PLCP) protocol data unit (PPDU), electronic device 110-1 may request one or more additional triggers, if needed.

Figure 15:
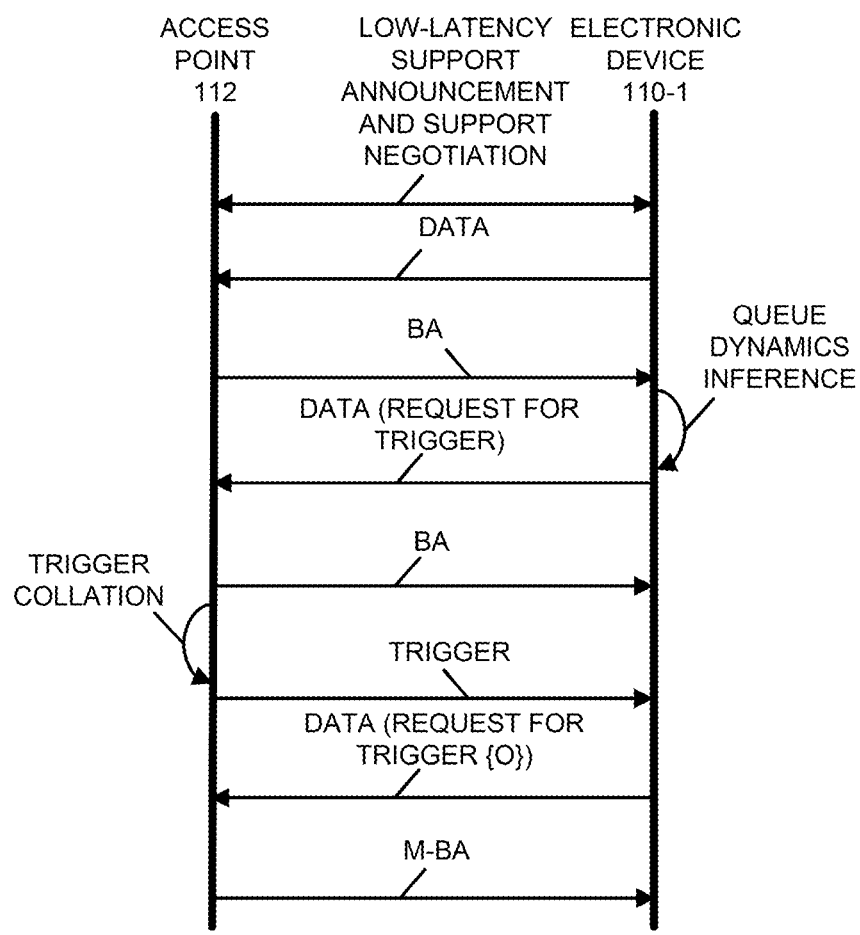

Moreover, as shown in FIG. 15, which presents a drawing illustrating an example of communication between access point 112 and electronic device 110-1, access point 112 and electronic device 110-1 may negotiate a low-latency requirement for electronic device 110-1. This negotiation may include a low-latency capability announcement by access point 112 (e.g., that access point 112 supports a station-requested trigger). Subsequently, after electronic device 110-1 provides data and access point 112 provides a BA, electronic device 110-1 may provide a data frame with a request for a trigger or a trigger frame based at least in part on a property or parameter associated with a queue in electronic device 110-1 (such as by inferring queue dynamics). Note that the request for the trigger or the trigger frame may include a deadline value that is a fraction of the pre-negotiated latency requirement of electronic device 110-1, such as at least k ms after a current transmission. Thus, k may be a fraction of the low-latency requirement that was negotiated between access point 112 and electronic device 110-1. This may limit the frequency of trigger requests from electronic device 110-1.

In response, access point 112 may provide a BA. Then, access point 112 may collate trigger requests and may make a decision to provide a trigger or a trigger frame to electronic device 110-1. Moreover, electronic device 110-1 may provide data in response to the trigger or the trigger frame using a data frame. Next, access point 112 may provide a M-BA frame.

Furthermore, the request for a trigger or a trigger frame may be used with one or more access categories (ACs). For example, the request for a trigger or a trigger frame may be used with a voice access category. In general, the low-latency requirement (and, thus, the ability to request a trigger or a trigger frame) may not be used with all queues or access categories.

Note that, during a transmit opportunity, all the A-control fields in A-MPDUs in a data frame may have the same setting (such as the request for a trigger or a trigger frame). Alternatively, the request for a trigger or a trigger frame may only be included in the A-control subfield in the data frame of, e.g., the last A-MPDU in a transmit opportunity. However, the A-control field in the data frame of another A-MPDU may be used.

Additionally, in a subsequent transmit opportunity, if access point 112 does not receive a request for a trigger, a trigger frame or an update, the previously received request for a trigger or a trigger frame may be cancelled if a scheduled request for a trigger or a trigger frame has not been sent.

In some embodiments, a low-latency flow requirement may be negotiated. This may restrict the request for a trigger or a trigger frame to avoid abuse (such as how frequently requests for a trigger or a trigger frame can be issued). Note that this may be extended to other access categories. For example, this may specify whether the video access category can use the request for a trigger or a trigger frame capability.

In IEEE 802.11ax, when there is a successful trigger, a station (such as electronic device 110-1) may not be allowed to use single-user (SU) access for a time interval, such as 2 s (e.g., via a MU-EDCA parameter). Because electronic device 110-1 relies on access point 112 to provide a trigger or a trigger frame, the MU-EDCA parameter may be set accordingly (e.g., during the negotiation) to allow single-user access after a successful triggered access (unless otherwise specified). This may ensure that single-user access is not deterred if an UL PPDU transmission is successful. Consequently, electronic device 110-1 may benefit from single-user and multi-user channel access, so that the number of channel accesses is increased (e.g., by 2× or 1+x times on average).

In contrast with a buffer status report (which may include information that specifies a buffer status), or a buffer and latency status report (which may report a longest queuing time of a data buffer, as well as the size and deadline to meet a latency requirement), which do not bind action by access point 112, the disclosed request for a trigger may ask for a trigger frame, and may specify requirements on the trigger or the trigger frame timing and resource allocation. Thus, a buffer status report or a buffer and latency status report may implicitly help an access point (such as access point 112) with scheduling, while a request for a trigger or a trigger frame may explicitly request scheduling by access point 112.

In addition to requesting a trigger frame from time to time, as needed, a station (such as electronic device 110-1) may obtain more transmission opportunities at the session level. For example, electronic device 110-1 may set up periodic triggers when a session is being initiated.

Figure 16:
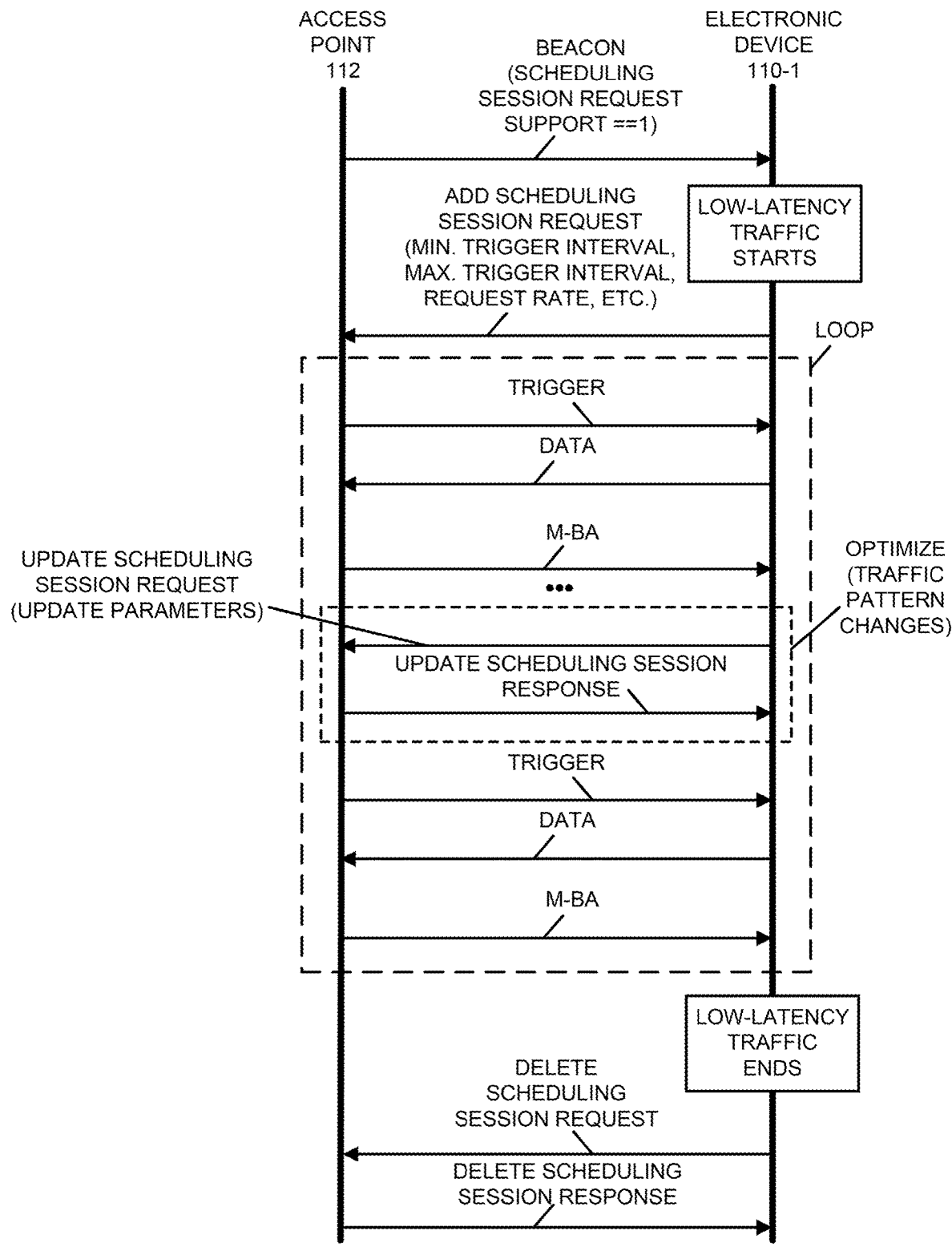

Moreover, as shown in FIG. 16, which presents a drawing illustrating an example of communication between access point 112 and electronic device 110-1, when a station (such as electronic device 110-1) starts low-latency traffic, if an access point (such as access point 112) supports a scheduling session request frame, electronic device 110-1 may request that access point 112 periodically schedule a trigger-based UL transmission. Electronic device 110-1 may not wait for the set-up of the scheduling session to finish before starting traffic. Furthermore, electronic device 110-1 may use an add scheduling session request/response frame to confirm with access point 112 the desired scheduling interval (or electronic device 110-1) and the required source allocation. For example, if the traffic pattern changes, electronic device 110-1 may update the scheduling session request. Note that the add scheduling session request/response frame may include other parameters for the scheduling session, such as per access category, traffic identifier (TID), etc. When electronic device 110-1 finishes the low-latency traffic, electronic device 110-1 may tear down the scheduling session, e.g., by providing a delete scheduling session request. Alternatively, access point 112 may unilaterally tear down the scheduling session if no traffic is received from electronic device 110-1 in predefined consecutive intervals (such as 5 or 10 transmission opportunities).

We now discuss the fast link adaptation technique. Many control systems are open loop and are based on a sampling technique. For example, specific parameters may be sampled over a certain probing interval, such as: an MCS index, NSS, a guard interval (GI), bandwidth, etc. However, these approaches may be proprietary (e.g., they may heuristically derive the next data rate based on packet loss, throughput, etc.) and may involve a large overhead.

Figure 17:
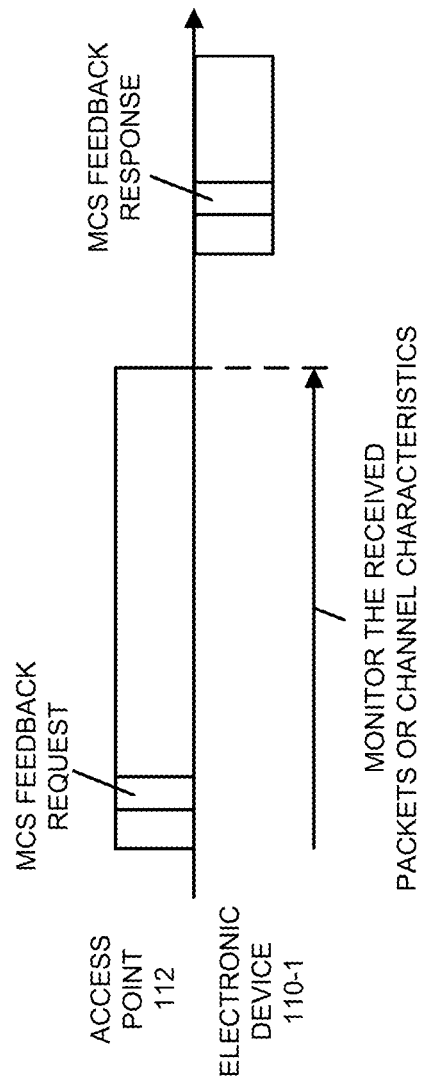

Moreover, as shown in FIG. 17, which presents a drawing illustrating an example of communication between access point 112 and electronic device 110-1, other link adaptation techniques use a closed-loop control system and a computation-based technique. For example, MCS feedback may be provided via a high throughput (HE)/a very high throughput (VHT)/high efficiency (HE) variant HT control field. Notably, a transmit electronic device or transmitter (such as access point 112) may provide an MCS feedback request, and a receive electronic device or receiver (such as electronic device 110-1) may monitor the received packets or frames or the channel characteristics. Then, the receive electronic device may compute an optimal MCS, and may provide MCS feedback in a response. However, often these capabilities may not be supported or implemented.

For example, there are a variety of reasons while the MCS feedback capabilities may not be supported or implemented. Notably, there may be hardware limitations, such as: for immediate feedback, the hardware may not be able to complete the computational task in time; and/or even if the hardware can finish, the result may not be trustworthy. Alternatively, the transmit electronic device and the receive electronic device may have different assumptions, such as: the receive electronic device may compute the optimal MCS under the assumption or in order to maximize throughput, while the transmit electronic device may choose to lower the MCS to reduce retransmission. Moreover, delayed feedback may not be useful. Nonetheless, in many existing approaches, feedback may only be provided when a station (such as electronic device 110-1) transmits a PPDU to an access point (such as access point 112).

In the disclosed fast link adaptation technique, one or more techniques may be used to address the problems with open-loop and closed-loop systems. Notably, measurements may be used instead of computation (which may address the problems associated with hardware limitations). For example, the receive electronic device may provide physical layer (PHY) measurements instead of a computed MCS, such as: a receive signal strength indicator (RSSI), channel state information or CSI (such as a signal-to-noise ratio or SNR per stream, an SNR per resource unit, etc.), a codeword error rate, etc.

Moreover, access point 112 and electronic device 110-1 may negotiate the feedback used. This may establish trust between a transmit electronic device and a receive electronic device on feedback results. This approach may also allow at least electronic devices from the same manufacturer to use the feedback. Furthermore, the measurement accuracy may be defined during this negotiation. In some embodiments, the feedback level may be negotiated. For example, level '0' may indicate that feedback is provided based at least in part on one or more criteria, such as when there is limited connectivity, such that the transmit electronic device may need to drop the rate, and when there is interference, such that the transmit electronic device may use request-to-send (RTS)/clear-to-send (CTS) requests, etc.; level '1' may indicate that measurement feedback is provided (such as RSSI, CSI, etc.); and level '2' may indicate that computation feedback is used (such as a computed optimal MCS).

Furthermore, the fast link adaptation technique may provide rapid or immediate feedback. Notably, existing approaches may provide feedback using: a control wrapper for an acknowledgment (ACK) with a compressed BA frame (which may only be available with high throughput/very high throughput, such as in IEEE 802.11n or IEEE 802.11ac, and is often not implemented); and/or using a compressed BA and a QoS null with an A-control field (however, processing of a QoS null frame is typically not mandated, and the 26-bit overhead is usually too high).

Figure 18:
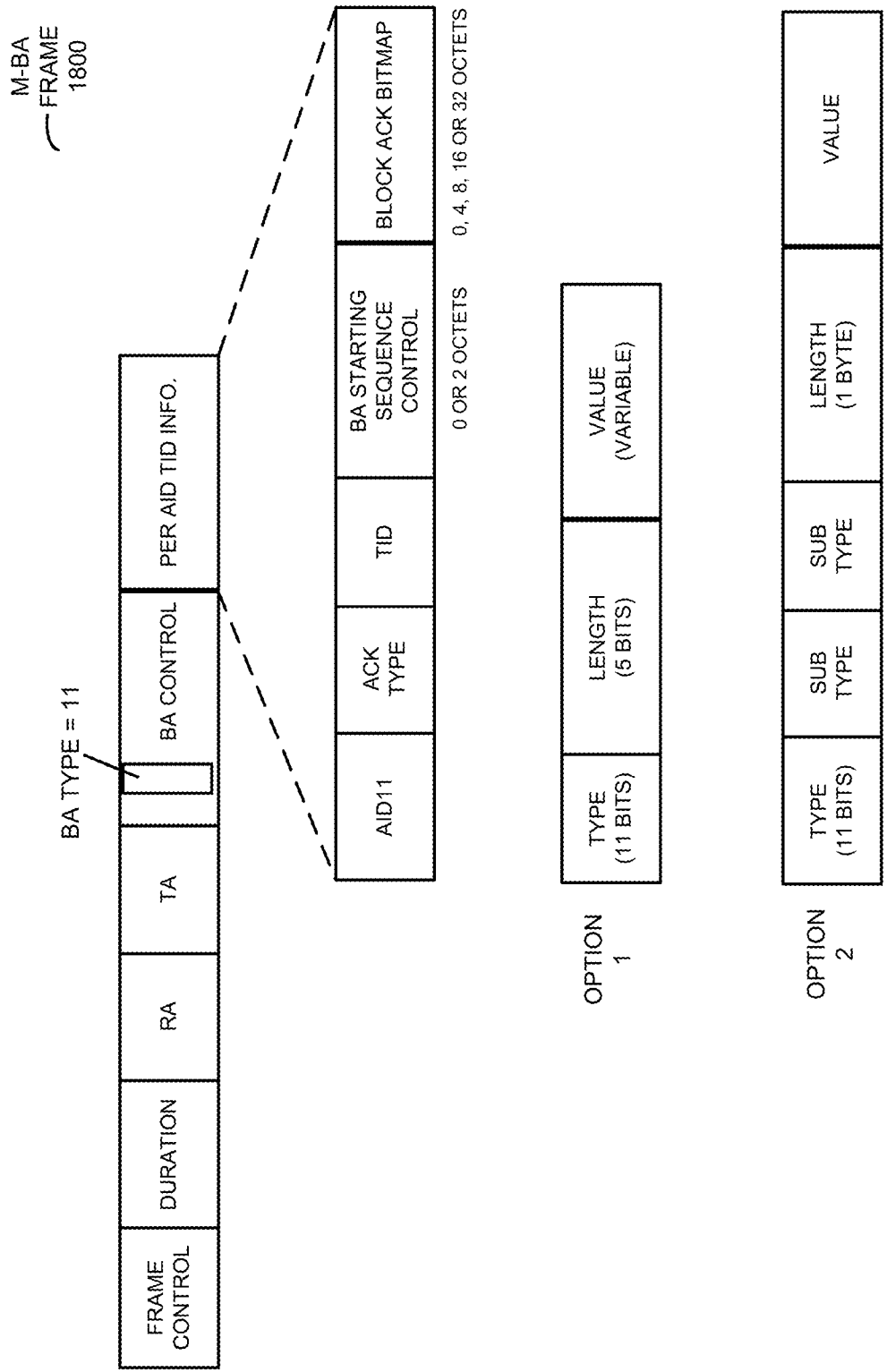
FIG. 18 illustrates an example of a multi-station block acknowledgment (M-BA) frame according to some embodiments of the disclosure.

In contrast, the fast link adaptation technique may use an enhanced M-BA frame. FIG. 18 presents a drawing illustrating an example of a M-BA frame 1800. This M-BA frame may include multiple instances of 'per association identifier (AID) TID' information following a BA control field (in contrast, a compressed BA may include a BA starting sequence control and a BA bitmap following the BA control field). When a BA type is '11,' the bits in the AID11 field may be used to specify a reserved AID between 0 and 2007. However, this may leave 40 options that can be used to indicate or specify non-BA information (such as link-adaptation feedback) in the subsequent variable-length fields (which may have a type-length-value format, in which the AID11 field indicates a type value). FIG. 18 illustrates options for the type-length-value format of the sub-fields that signal the non-BA information.

As noted previously, access point 112 and electronic device 110-1 may negotiate the use of an enhancement M-BA frame.

In some embodiments, the enhanced M-BA frame may be signaled using extended capabilities for electronic devices that support IEEE 802.11ax and/or more-recent IEEE 802.11 standards. By using reserved bits in an additional block-acknowledgment (ADDBA) extension element, ADDBA exchanges may specify or define an additional block-acknowledgment parameter when M-BA frames are used for an entire session.

Alternatively or additionally to using AID values greater than 2007, non-BA information may be indicated using an AID11 field value that is greater than 2007 to indicate the type, and an acknowledgment type plus a traffic identifier may be used to indicate a subtype. Note that five acknowledgment types (AckType) and traffic identifier bits may provide $2^5$ options. When used in conjunction with an AID11 field value that is greater than 2007, the total number of options may be $40 \cdot 2^5$.

Figure 19:
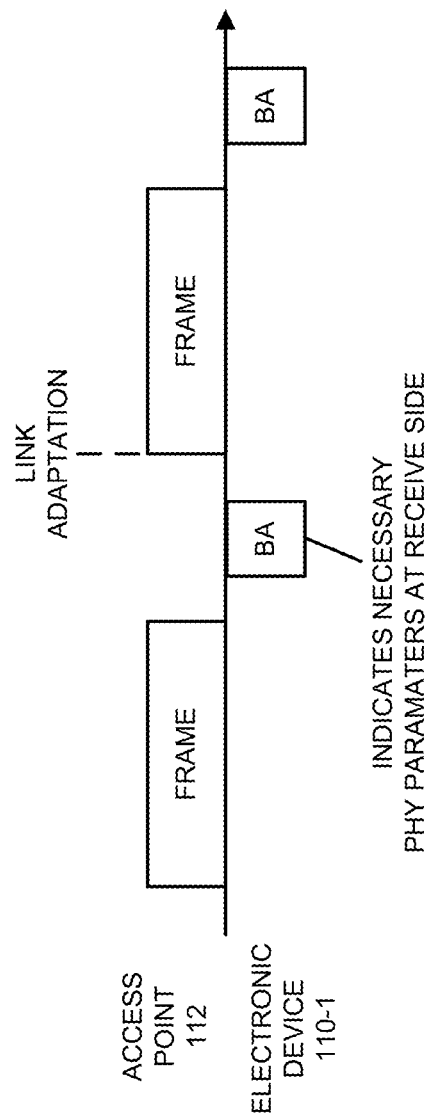
FIGS. 19-21 illustrate examples of communication, e.g., between the electronic devices of FIG. 1 according to some embodiments of the disclosure.

As shown in FIG. 19, which presents a drawing illustrating an example of communication between access point 112 and electronic device 110-1, a M-BA frame may be used to provide physical layer parameters to a transmit electronic device that can assist fast and accurate link adaptation, such as: a transmit power at a receive side, an RSSI, an MCS, a codeword error rate, a channel quality indicator (CQI), etc.

The following discussion provide examples of other uses for the non-BA information conveyed in a M-BA frame. For example, the non-BA information may be used to provide coexistence assistance with another radio technology. Notably, in Wi-Fi/Bluetooth (BT) coexistence design, a timing-sharing mechanism may be used for advanced audio distribution (A2DP) profiles. There may be a fixed-length WLAN time, and a pre-scheduled Bluetooth time. When Bluetooth is done and there is still time left, a WLAN may take advantage of this time. However, this may be counted toward the fix-length WLAN time. However, close to the end of the WLAN time, if a station (such as electronic device 110-1) is in a receive state, electronic device 110-1 may need to let the peer know that electronic device 110-1 will be away for a while. An existing flow-control mechanism may rely on CTS to self and/or QoS null (with a power management or PM equal to '1') to an access point (such as access point 112)/self, which may not reach the peer in a timely manner. Moreover, flow control frames may impose additional overhead.

Figure 20:
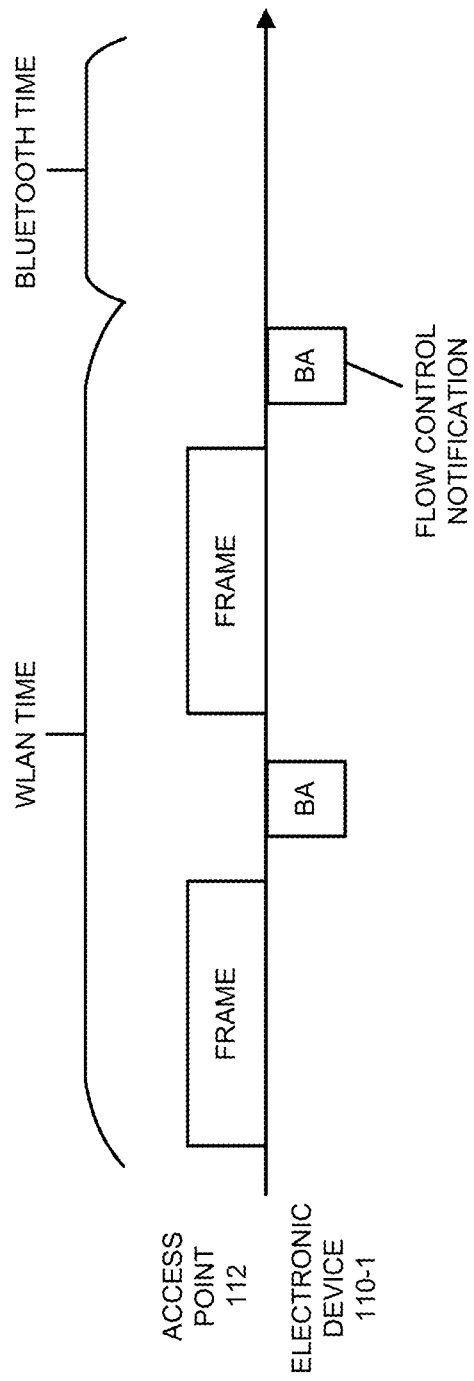

Moreover, as shown in FIG. 20 presents a drawing illustrating an example of communication between access point 112 and electronic device 110-1, a M-BA frame may be used for flow control (such as to provide a flow-control notification). Notably, in a station receive case (such as by electronic device 110-1), a WLAN may know when the WLAN time is over and can signal a peer accordingly using a M-BA frame when the time is running out. The signaling may include: a shortening of the PPDU length for the next A-MPDU; discontinuing of sending of an A-MPDU; and/or setting a power management status with the peer. Note that after Bluetooth time is done, access point 112 may send a trigger frame to resume WLAN traffic.

Figure 21:
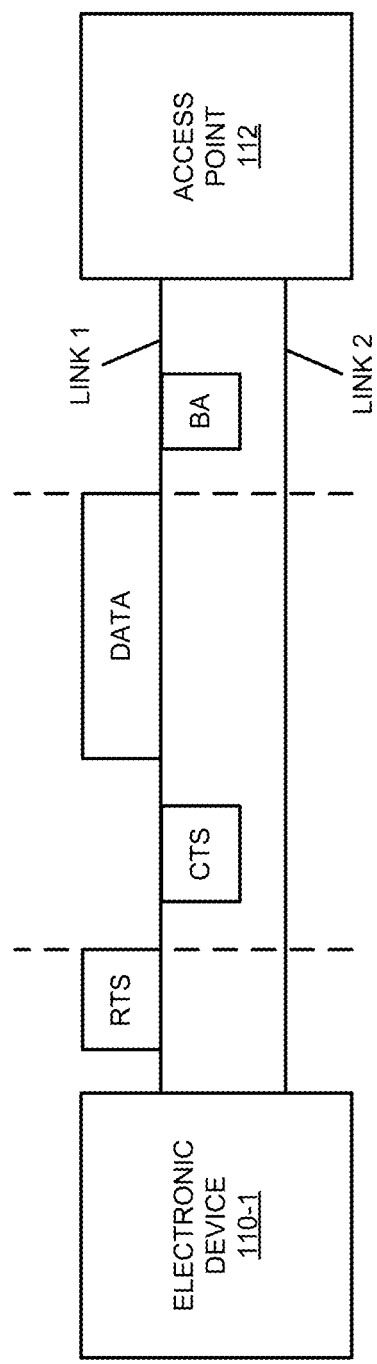

Furthermore, as shown in FIG. 21, which presents a drawing illustrating an example of communication between access point 112 and electronic device 110-1, a M-BA frame may be used to synchronize transmission with multiple links (such as in IEEE 802.11be). For example, in order to recover enhanced distributed channel access (EDCA) operation on a second of two links, the minimum required information may include: how long the medium is idle during RTS and a short interframe space (SIFS); and a current network allocation vector (NAV) set at a responder to an RTS. Note that in contrast with other approaches, some embodiments allow control frames to be processed lower in a MAC layer, which is faster compared to a management frame; and/or provide more available space and a flexible design compared to physical layer header.

Additionally, during EDCA recovery, per AID TID information in a M-BA frame may be expanded. Notably, a predefined or pre-negotiated AID11 field value greater than 2007 may be used to indicate link medium information is included in the subsequent fields. For example, a BA starting sequence control field and a BA bitmap may be redefined as: a link identifier (e.g., a fixed number of bits), a medium idle time during data transmission and the SIFS, and/or a NAV update during data transmission and the SIFS. This approach may provide: sufficient bits to indicate another medium information for another link such as link 2 of FIG. 21 (e.g., two 32-bit duration fields may be accommodated); and/or multiple per AID TID link medium information' fields that may cover multiple links, instead of being limited to one link.

Figure 22:
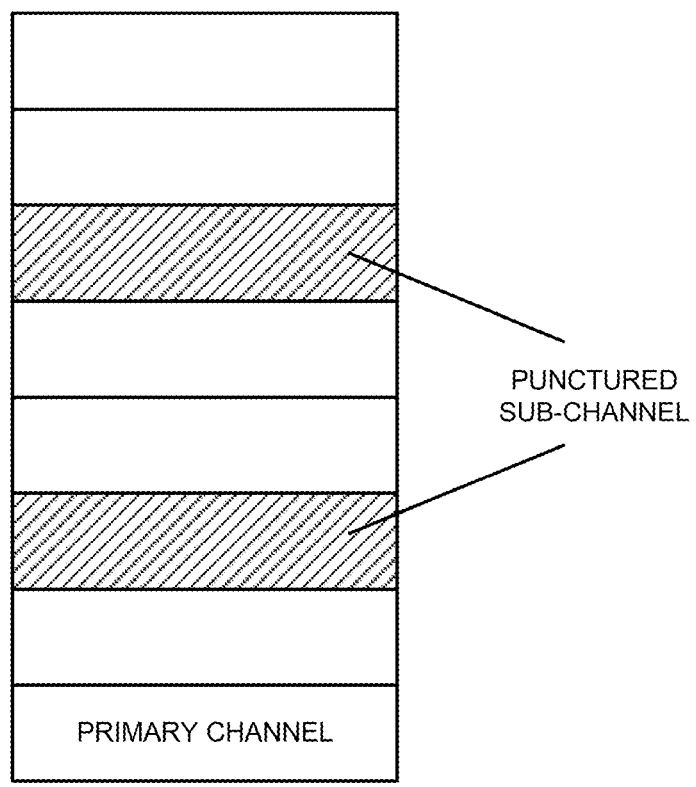
FIG. 22 illustrates an example of sub-channels used during communication, e.g., between the electronic devices of FIG. 1 according to some embodiments of the disclosure.

As shown in FIG. 22, which presents a drawing illustrating an example of sub-channels used during communication between access point 112 and electronic device 110-1, a M-BA frame may be used to indicated preferred punctured channels. For example, in IEEE 802.11be, a wider channel bandwidth (such as 320 MHz) may be supported. However, it may be preferable if certain 20 MHz sub-channels can be punctured to avoid interference or a coexistence issue. This information (such as a punctured channel bitmap, e.g., {0, 0, 1, 0, 0, 1, 0, 0}) may be signaled via a M-BA frame in 'per AID TID information.'

Moreover, other use cases may include: power saving without sending out a QoS null frame with a power management bit set; an operation mode indication; a buffer and latency status report; a preferred link for buffered data (note that an access point, such as access point 112, may send a traffic indication map or TIM to indicate that there is buffered data on one link, but the TIM may not have additional information about which link); and/or other types of information that can be carried in A-control of high efficiency MAC header.

Furthermore, during BA session operation (e.g., in IEEE 802.11be), a BA frame may be replaced with a M-BA frame. If this capability is optional instead of mandatory, it may be signaled in extended capabilities for an IEEE 802.11ax compatible electronic device and a newer generation electronic device. Note that using reserved bits in an ADDBA extension element, ADDBA exchanges may specify or define an additional block-acknowledgment parameter whether or not M-BA frames are used for an entire session.

In some embodiments, per AID TID information with AID greater than 2007 may be used for a single user transaction, e.g., a resource allocation (RA) address equal to a unicast address. If the resource allocation address equals a broadcast/multicast address, an AID11 greater than 2007 per AID TID Information may only be processed in the station (s) (such as, e.g., electronic device 110-1) indicated in the per AID TID information, as is the case when AID11 is less than or equal to 2007.

Additionally, AID11 field values between 2008 and 2011 may be reserved for vendor-specific operation in case there is any interoperability issue. Note that any non-acknowledgement-related per AID TID information may be put in front of the per AID TID information containing acknowledgement information. This may be used to facilitate faster processing.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 23 presents a block diagram of an electronic device 2300 (which may be a cellular telephone, a smartwatch, an access point, a wireless speaker, an IoT device, another electronic device, etc.) in accordance with some embodiments. This electronic device includes processing subsystem 2310, memory subsystem 2312 and networking subsystem 2314. Processing subsystem 2310 includes one or more devices configured to perform computational operations. For example, processing subsystem 2310 can include one or more microprocessors, application-specific integrated circuits (ASICs), microcontrollers, graphics processing units (GPUs), programmable-logic devices, and/or one or more digital signal processors (DSPs).

Memory subsystem 2312 includes one or more devices for storing data and/or instructions for processing subsystem 2310, and/or networking subsystem 2314. For example, memory subsystem 2312 can include dynamic random access memory (DRAM), static random access memory (SRAM), a read-only memory (ROM), flash memory, and/or other types of memory. In some embodiments, instructions for processing subsystem 2310 in memory subsystem 2312 include: program instructions or sets of instructions (such as program instructions 2322 or operating system 2324), which may be executed by processing subsystem 2310. For example, a ROM can store programs, utilities or processes to be executed in a non-volatile manner, and DRAM can provide volatile data storage, and may store instructions related to the operation of electronic device 2300. Note that the one or more computer programs may constitute a computer-program mechanism, a computer-readable storage medium or software. Moreover, instructions in the various modules in memory subsystem 2312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2310. In some embodiments, the one or more computer programs are distributed over a network-coupled computer system so that the one or more computer programs are stored and executed in a distributed manner.

In addition, memory subsystem 2312 can include mechanisms for controlling access to the memory. In some embodiments, memory subsystem 2312 includes a memory hierarchy that comprises one or more caches coupled to a memory in electronic device 2300. In some of these embodiments, one or more of the caches is located in processing subsystem 2310.

In some embodiments, memory subsystem 2312 is coupled to one or more high-capacity mass-storage devices (not shown). For example, memory subsystem 2312 can be coupled to a magnetic or optical drive, a solid-state drive, or another type of mass-storage device. In these embodiments, memory subsystem 2312 can be used by electronic device 2300 as fast-access storage for often-used data, while the mass-storage device is used to store less frequently used data.

Networking subsystem 2314 includes one or more devices configured to couple to and communicate on a wired and/or wireless network (i.e., to perform network operations), such as: control logic 2316, one or more interface circuits 2318 and a set of antennas 2320 (or antenna elements) in an adaptive array that can be selectively turned on and/or off by control logic 2316 to create a variety of optional antenna patterns or 'beam patterns.' Alternatively, instead of the set of antennas, in some embodiments electronic device 2300 includes one or more nodes 2308, e.g., a pad or a connector, which can be coupled to the set of antennas 2320. Thus, electronic device 2300 may or may not include the set of antennas 2320. For example, networking subsystem 2314 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 2314 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 2314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2300 may use the mechanisms in networking subsystem 2314 for performing simple wireless communication between the electronic devices, e.g., transmitting advertising or frame frames and/or scanning for advertising frames transmitted by other electronic devices.

Within electronic device 2300, processing subsystem 2310, memory subsystem 2312 and networking subsystem 2314 are coupled together using bus 2328 that facilitates data transfer between these components. Bus 2328 may include an electrical, optical, and/or electro-optical connection that the subsystems can use to communicate commands and data among one another. Although only one bus 2328 is shown for clarity, different embodiments can include a different number or configuration of electrical, optical, and/or or electro-optical connections among the sub systems.

In some embodiments, electronic device 2300 includes a display subsystem 2326 for displaying information on a display, which may include a display driver and the display, such as a liquid-crystal display, a multi-touch touchscreen, etc. Display subsystem 2326 may be controlled by processing subsystem 2310 to display information to a user (e.g., information relating to incoming, outgoing, or an active communication session).

Electronic device 2300 can also include a user-input subsystem 2330 that allows a user of the electronic device 2300 to interact with electronic device 2300. For example, user-input subsystem 2330 can take a variety of forms, such as: a button, keypad, dial, touch screen, audio input interface, visual/image capture input interface, input in the form of sensor data, etc.

Electronic device 2300 can be (or can be included in) any electronic device with at least one network interface. For example, electronic device 2300 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 2300, in alternative embodiments, different components and/or subsystems may be present in electronic device 2300. For example, electronic device 2300 may include one or more additional processing subsystems, memory subsystems, networking subsystems, and/or display subsystems. Additionally, one or more of the subsystems may not be present in electronic device 2300. Moreover, in some embodiments, electronic device 2300 may include one or more additional subsystems that are not shown in FIG. 23. In some embodiments, electronic device may include an analysis subsystem that performs at least some of the operations in the communication techniques. Also, although separate subsystems are shown in FIG. 23, in some embodiments some or all of a given subsystem or component can be integrated into one or more of the other subsystems or component(s) in electronic device 2300. For example, in some embodiments program instructions 2322 are included in operating system 2324 and/or control logic 2316 is included in the one or more interface circuits 2318.

Moreover, the circuits and components in electronic device 2300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 2314. This integrated circuit may include hardware and/or software mechanisms that are used for transmitting wireless signals from electronic device 2300 and receiving signals at electronic device 2300 from other electronic devices. Aside from the mechanisms herein described, radios are generally known in the art and hence are not described in detail. In general, networking subsystem 2314 and/or the integrated circuit can include any number of radios. Note that the radios in multiple-radio embodiments function in a similar way to the described single-radio embodiments.

In some embodiments, networking subsystem 2314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 2322, operating system 2324 (such as a driver for an interface circuit in networking subsystem 2314) or in firmware in an interface circuit networking subsystem 2314. Alternatively or additionally, at least some of the operations in the communication techniques may be implemented in a physical layer, such as hardware in an interface circuit in networking subsystem 2314. In some embodiments, the communication techniques are implemented, at least in part, in a MAC layer and/or in a physical layer in an interface circuit in networking subsystem 2314.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an interface circuit, communicatively coupled to an antenna node, configured to communicate with a second electronic device, wherein the electronic device is configured to:
   receive, via the interface circuit, a frame associated with the second electronic device, wherein the frame comprises a media access control (MAC) header that comprises an A-control field having information specifying a request for a trigger frame, wherein the information indicates a suggested time interval during which the trigger frame is to be provided and a requested resource allocation, and wherein the trigger frame is configured to provide trigger-based channel access; and
   transmit, via the interface circuit, the trigger frame addressed to the second electronic device based at least in part on the request for the trigger frame, wherein the request for the trigger frame is based at least in part on a previously negotiated latency requirement that is different from an access category.

2. The electronic device of claim 1, wherein the electronic device is configured to receive, via the interface circuit, a second frame associated with the second electronic device.

3. The electronic device of claim 2, wherein the electronic device is configured to cancel the request for the trigger frame at a subsequent transmit opportunity when a second request for a trigger, a trigger frame or a trigger update associated with the second electronic device is not received.

4. The electronic device of claim 1, wherein the frame comprises multiple aggregated-MAC-level protocol data units (A-MPDUs) and each of the A-MPDUs comprise the information.

5. The electronic device of claim 1, wherein the frame comprises multiple aggregated-MAC-level protocol data units (A-MPDUs) and a last A-MPDU in the multiple A-MPDUs comprises the information.

6. The electronic device of claim 1, wherein the frame comprises: a data frame with the A-Control subfield in the MAC header specifying the information of the request for the trigger frame, or a control frame alone specifying the information of the request for the trigger frame.

7. The electronic device of claim 1, wherein the requested resource allocation comprises a capacity.

8. The electronic device of claim 1, wherein the suggested time interval begins at a previous transmission associated with the second electronic device.

9. The electronic device of claim 1, wherein the request for the trigger frame is associated with a subset of types of access categories.

10. The electronic device of claim 1, wherein the latency requirement is associated with a subset of types of access categories or a frequency of requests for triggers or trigger frames associated with the second electronic device.

11. The electronic device of claim 1, wherein the electronic device is configured to receive, via the interface circuit, a multi-station block acknowledgment associated with the second electronic device that comprises feedback information about communication between the electronic device and the second electronic device.

12. The electronic device of claim 1, wherein the electronic device is configured to receive, via the interface circuit, a scheduling session request frame associated with the second electronic device; and
   wherein the scheduling session request frame comprises a request for periodic triggers.

13. A method for providing a trigger frame, comprising:
   by an electronic device:
   receiving a frame associated with a second electronic device, wherein the frame comprises a media access control (MAC) header that comprises an A-control field having information specifying a request for a trigger frame, wherein the information indicates a suggested time interval during which the trigger frame is to be provided and a requested resource allocation, and wherein the frame comprises a data frame; and
   providing the trigger frame addressed to the second electronic device based at least in part on the request for the trigger frame, wherein the request for the trigger frame is based at least in part on a previously negotiated latency requirement that is different from an access category.

14. The method of claim 13, wherein the method comprises cancelling the request for the trigger frame at a subsequent transmit opportunity when a second request for a trigger, a trigger frame or a trigger update associated with the second electronic device is not received.

15. The method of claim 13, wherein the method comprises receiving a multi-station block acknowledgment associated with the second electronic device that comprises feedback information about communication between the electronic device and the second electronic device.

16. An electronic device, comprising:
   an interface circuit, communicatively coupled to an antenna node, configured to communicate with a second electronic device, wherein the electronic device is configured to:
   transmit, via the interface circuit, a frame addressed to the second electronic device, wherein the frame comprises a media access control (MAC) header that comprises an A-control field having information specifying a request for a trigger frame, and wherein the information indicates a suggested time interval during which the trigger frame is to be provided and a requested resource allocation; and
   receive, via the interface circuit, the trigger frame associated with the second electronic device based at least in part on the request for the trigger frame, wherein the trigger frame is configured to provide trigger-based channel access, wherein the request for the trigger frame is based at least in part on a previously negotiated latency requirement that is different from an access category.

17. The electronic device of claim 16, wherein the requested resource allocation corresponds to a queue condition in the second electronic device.

18. The electronic device of claim 16, wherein the electronic device is configured to provide, via the interface circuit, a multi-station block acknowledgment addressed to the electronic device that comprises feedback information about communication between the electronic device and the second electronic device.

19. The electronic device of claim 16, wherein the frame comprises two aggregated-MAC-level protocol data units (A-MPDUs) that each comprise the information.

20. The electronic device of claim 16, wherein the suggested time interval begins at a previous transmission associated with the electronic device.

* * * * *